G. W. S. BELL.
Corn Harvester.
No. 94,549. Patented Sept. 7, 1869.
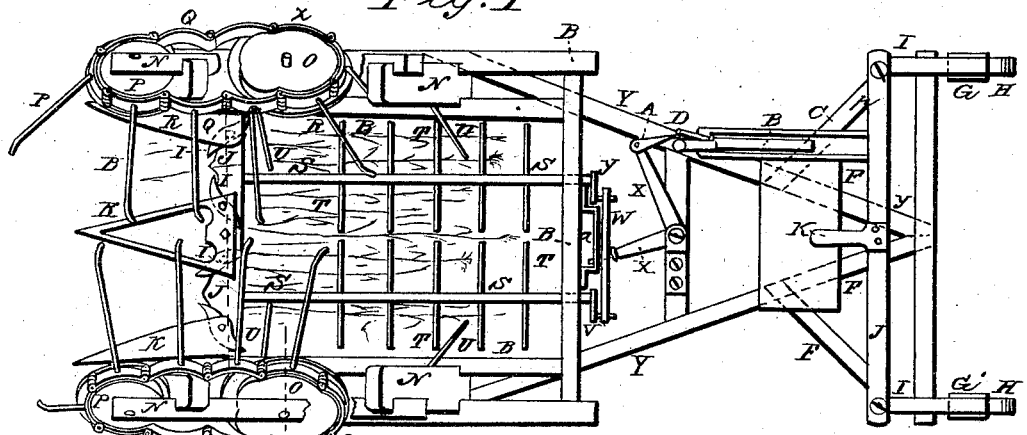
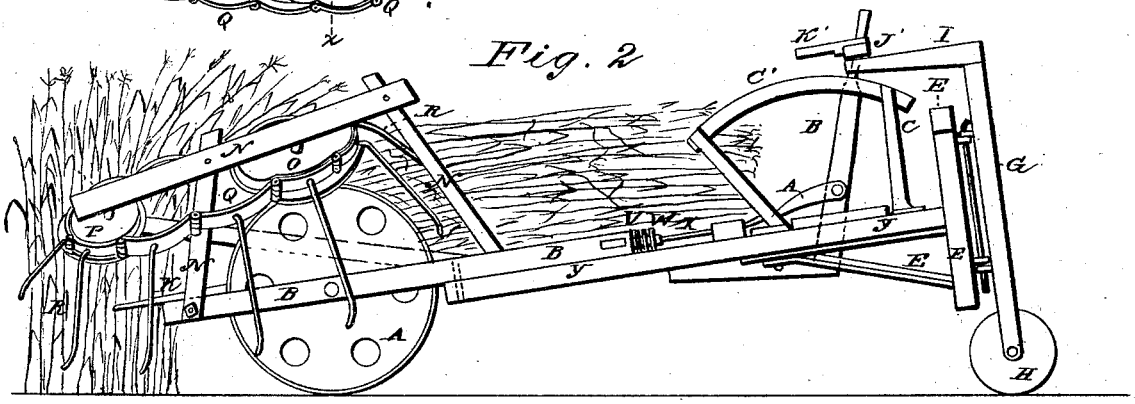
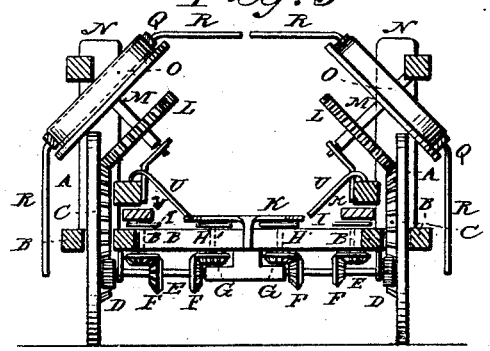
Witnesses
Chas. Nida.
Alex F. Roberts
Inventor
G. W. S. Bell
Mumm & Co.
Attorneys

United States Patent Office.

G. W. S. BELL, OF TALLULA, ILLINOIS, ASSIGNOR TO HIMSELF AND H. C. BELL, OF SAME PLACE.

Letters Patent No. 94,549, dated September 7, 1869.

IMPROVEMENT IN CORN-HARVESTERS.

The Schedule referred to in these Letters Patent and making part of the same.

*To all whom it may concern:*

Be it known that I, G. W. S. BELL, of Tallula, in the county of Menard, and State of Illinois, have invented a new and improved Corn-Harvester; and I do hereby declare that the following is a full, clear, and exact description thereof, which will enable others skilled in the art to make and use the same, reference being had to the accompanying drawings, forming part of this specification, in which—

Figure 1 is a top or plan view of my improved corn-harvester.

Figure 2 is a side view of the same.

Figure 3 is a detail vertical cross-section of the same, taken through the line *x x*, fig. 1.

Similar letters of reference indicate corresponding parts.

My invention has for its object to furnish an improved corn-harvester, which shall be so constructed and arranged as to cut the corn two rows at a time, and deposit it in bundles upon the ground, and which shall be simple in construction, effective in operation, and easily guided when at work; and It consists in the construction and combination of the various parts, as hereinafter more fully described.

A are the drive-wheels, the journals of each of which revolve in bearings in the two parallel bars, which form the sides of the frame B.

Upon the inner side of each of the wheels A is formed, or to it is attached a gear-wheel, C, which is provided with two sets of gear-wheels, one square and the other bevelled, or with a single set of bevel teeth, as may be desired.

Into the teeth of the gear-wheels C mesh the teeth of the gear-wheels D, attached to the outer ends of the short horizontal shaft E, which revolve in bearings attached to the under side of the front cross-bar of the frame B.

To each of the shafts E are attached two small bevel-gear wheels F, into the teeth of which mesh the teeth of the small bevel-gear wheels G, attached to the lower ends of the short vertical shafts H, which pass up through the front cross-bar of the frame B, and to the upper ends of which are attached the middle parts of the cutters I, which, as the shafts H revolve, cut off the corn-stalks against the inclined edge of the plate J, attached to the upper side of the front cross-bar of the frame B.

K are guides, attached to the front cross-bar of the frame B, which, as the machine is drawn forward, guide the corn-stalks into proper position to be operated upon by the cutters or knives I.

L are gear-wheels, the teeth of which mesh into the teeth of the gear-wheels C, and which are attached to the shafts M.

The shafts M are set at an angle of about forty-five degrees, (45°,) and work in bearings in the frames N, attached to the side bars of the frame B.

To the upper part of the inclined shafts M are attached pulleys O, having flanges formed upon their lower sides.

P are pulleys, pivoted to the forward part of the frames N, around which, and around the pulleys O, pass endless chains or bands Q, which may be formed by hinging short bars or plates to each other, as shown in the drawings, or in any other convenient form.

To the chains Q are attached arms or fingers R, projecting downward at an angle of about forty-five degrees, (45°,) which inclination, in connection with the inclination of the pulleys O and P, causes the arms or fingers R to project down nearly vertically when moving forward along the outer sides of the frames N, and to project nearly horizontally when moving back over the frame B, so as to guide the corn to the cutters, and after being cut, back to the platform upon which it falls, and from which it is dropped to the ground in a bundle.

S are two shafts, the ends of which work in bearings in the front and rear cross-bars of the frame B.

To the shafts S are attached equal-armed cross-bars T, upon which the cut corn rests. The shafts S and cross-bars T are so arranged as to occupy the entire space between the side and end bars of the frame B.

U are downwardly-inclined guard-arms, the outer ends of which are attached to the frames N, and the inner ends of which project to, or nearly to, the shafts S, to guide the corn-stalks as they fall upon the platform, so that they may rest only upon the inner ends of the cross-arms T.

To the rear ends of the shafts S are attached small cranks V, which are connected by a connecting-rod W, the ends of which are pivoted to the said cranks, to cause the said cranks to move together.

X is a bent lever, which is pivoted at its angle to the frame Y, and its forward arm passes through a hole in the centre of the connecting-bar W, to give motion to said bar, and through it and the cranks V, to tilt the platform S T, to drop the bundle of corn-stalks to the ground.

The end of the forward arm of the bent lever X also passes through a horizontal slot in the keeper or bar Z, attached to the rear cross-bar of the frame B, to cause the said lever to move horizontally when operating the connecting-bar W, and to support the said lever X, when serving as a pivot to the said bar W.

To the end of the other arm of the bent lever X is pivoted the forward end of the connecting-bar A', the rear end of which is pivoted to the lever B'. The lower end of the lever B' is pivoted to the frame Y, and its upper end extends up into such a position that it may be conveniently reached and operated by the driver standing upon the platform attached to the frame Y.

The upper end of the lever B' passes up through a curved guide-frame, C', attached to the frame Y, and is provided with a spring-catch, D', which catches in notches formed in the ends of the guide-frame C', to hold the lever B' securely in either position.

The frame Y is made narrower than the frame B, (I prefer to make it triangular,) to give space for the horses at each side of said frame Y. The forward end of the frame Y is securely attached to the rear end of the frame B, and to its rear end is securely attached the cross-frame E', the connection being strengthened by braces F', as shown in figs. 1 and 2.

To the side posts of the cross-frame E' are hinged vertical posts G', to the lower ends of which are pivoted small wheels H', upon which the rear end of the machine rests.

To the upper ends of the posts G' are attached single-armed cross-heads I', projecting forward, and the ends of which are connected by a cross-bar, J', having a handle, K', attached to its middle part, so that the machine can be conveniently guided by turning the posts G upon their pivoting-points.

By this arrangement, a movement of the free end of the lever B' in either direction will give a half revolution to the armed shafts S T, to deposit the bundle of corn upon the ground, the weight of the corn upon the inner ends of the cross-arms T of the shafts S, always throwing the cranks V off their centres, in such a direction that the movement of the lever B' in either direction will revolve the shafts S in the proper direction to drop the corn upon the ground.

Having thus described my invention,

I claim as new, and desire to secure by Letters Patent—

1. The armed belts or chains Q R, connected with and driven from the drive-wheels A, by suitable gearing, in combination with the cutting-device and tilting platform, substantially as herein shown and described, and for the purpose set forth.

2. The rotating knives I, connected with and driven from the drive-wheels A, by suitable gearing, in combination with the pointed or inclined guides K, armed belts or chains Q R, and tilting platform S T, substantially as herein shown and described, and for the purpose set forth.

3. The pivoted armed shafts S T, in combination with the cutting-device I J K and endless armed belts or chains Q R, substantially as herein shown and described, for the purpose of holding the cut corn-stalks and dropping them in bundles upon the ground.

4. The combination of the cranks V, slotted bar Z, connecting-bar W, bent lever X, connecting-bar A', and lever B', with each other and with the armed shafts S T, substantially as herein shown and described, for the purpose of holding and revolving the armed shafts S T, to hold and drop the bundles of stalks upon the ground.

5. The combination of the pivoted posts G', wheels H', cross-heads I', and connecting-bar J', with each other and with the frames E' Y, substantially as herein shown and described, and for the purpose set forth.

G. W. S. BELL.

Witnesses:
R. A. GAUNT,
W. S. BELL.